United States Patent
Haug et al.

(10) Patent No.: US 11,965,131 B2
(45) Date of Patent: Apr. 23, 2024

(54) TREATMENT OF PRODUCED HYDROCARBONS

(71) Applicant: Equinor Energy AS, Stavanger (NO)

(72) Inventors: Ingvild Johanne Haug, Stavanger (NO); Børre Tore Børresen, Heimdal (NO); Heidi Mediaas, Heimdal (NO); Hege Kummernes, Stavanger (NO); Ivar Øystein Larsen, Stavanger (NO)

(73) Assignee: EQUINOR ENERGY AS, Stavanger (NO)

( * ) Notice: Subject to any disclaimer, the term of this patent is extended or adjusted under 35 U.S.C. 154(b) by 0 days.

(21) Appl. No.: 17/415,946

(22) PCT Filed: Dec. 20, 2019

(86) PCT No.: PCT/NO2019/050288
§ 371 (c)(1),
(2) Date: Jun. 18, 2021

(87) PCT Pub. No.: WO2020/130852
PCT Pub. Date: Jun. 25, 2020

(65) Prior Publication Data
US 2022/0064515 A1    Mar. 3, 2022

(30) Foreign Application Priority Data

Dec. 21, 2018    (GB) ..................................... 1821117

(51) Int. Cl.
*C09K 8/524*    (2006.01)
*C09K 8/536*    (2006.01)

(52) U.S. Cl.
CPC .............. *C09K 8/524* (2013.01); *C09K 8/536* (2013.01)

(58) Field of Classification Search
CPC ........ C09K 8/532; C09K 8/536; C09K 8/528; C09K 8/52; C09K 8/524; C10G 2300/203; C10G 2033/205
See application file for complete search history.

(56) References Cited

U.S. PATENT DOCUMENTS 2,003,640 A * 6/1935 Wunsch .................. C07C 51/48
562/511
2005/0282915 A1* 12/2005 Ubbels ................... C10G 29/20
508/389

(Continued)

FOREIGN PATENT DOCUMENTS

CA    2767250 A1 *    1/2011    ............. C09K 8/584
WO    WO-2007065107 A2 *    6/2007    ............. C09K 8/524

(Continued)

OTHER PUBLICATIONS

International Search Report, issued in PCT/NO2019/050288, dated Feb. 7, 2020.

(Continued)

*Primary Examiner* — Angela M DiTrani Leff
(74) *Attorney, Agent, or Firm* — Birch, Stewart, Kolasch & Birch, LLP

(57) ABSTRACT

A method for managing metal naphthenates in produced hydrocarbons includes injecting acid and/or sour gas into produced hydrocarbons in a production well, flowline or riser, to thereby control the pH of fluids contained in the produced hydrocarbons.

16 Claims, 5 Drawing Sheets

(56) References Cited

U.S. PATENT DOCUMENTS

| | | | |
|---|---|---|---|
| 2009/0036329 A1 | 2/2009 | Debord et al. | |
| 2010/0022420 A1* | 1/2010 | Smith | C09K 8/524 |
| | | | 507/239 |
| 2010/0160680 A1* | 6/2010 | Levine | C07C 51/02 |
| | | | 562/511 |
| 2013/0210155 A1 | 8/2013 | Khandekar et al. | |
| 2017/0349841 A1* | 12/2017 | Grande | C10G 31/08 |

FOREIGN PATENT DOCUMENTS

| | | | | |
|---|---|---|---|---|
| WO | WO 2007/086661 A1 | 8/2007 | | |
| WO | WO 2008/007847 A1 | 1/2008 | | |
| WO | WO-2008007847 A1 * | 1/2008 | | C10G 17/02 |
| WO | WO 2010/017575 A1 | 2/2010 | | |
| WO | WO 2016/101998 A1 | 6/2016 | | |
| WO | WO 2017/158049 A1 | 9/2017 | | |
| WO | WO 2018/057367 A1 | 3/2018 | | |
| WO | WO-2018057367 A1 * | 3/2018 | | C10G 17/00 |
| WO | WO-2018234907 A1 * | 12/2018 | | C09K 8/524 |

OTHER PUBLICATIONS

United Kingdom Combined Search and Examination Report, issued in Priority Application No. 1821117.7, dated May 16, 2019.
Written Opinion of the International Searching Authority, issued in PCT/NO2019/050288, dated Feb. 7, 2020.

* cited by examiner

TREATMENT OF PRODUCED HYDROCARBONS

TECHNICAL FIELD

The present invention relates to the treatment of produced hydrocarbons, and in particular to metal naphthenate management in produced hydrocarbons.

BACKGROUND

Liquid hydrocarbons are typically produced from a reservoir in a formation, and are conveyed from the reservoir via a production well. Produced liquid hydrocarbons typically contain a variety of impurities and/or foreign substances. Such impurities and/or foreign substances include water, salts (which may be contained in the water), gases, organometallic compounds and organic acids, and solids. To mitigate potential damage to equipment and to comply with regulations and/or customer requirements, it is necessary to remove, reduce or transform the impurities and/or foreign substances before the crude is sold to customers. To achieve this, the liquid hydrocarbons are typically processed at a processing facility.

Different types of naphthenic acids and naphthenates exist in crude oil. The naphthenic acids can be divided into three main classes: 1) the tetraprotic ARN naphthenic acids forming depositions, 2) naphthenic acids forming surfactants and 3) naphthenic acids forming oil soluble naphthenates.

For some liquid hydrocarbons a processing step to remove metal naphthenates may be required. Metal naphthenates typically form when the pH of water in produced fluids increases during processing, which in turn typically results from a reduction in pressure. Metal naphthenates may, as already mentioned, act as surfactants, stabilising oil/water emulsions, making the oil/water separation and desalting processing steps more difficult. Metal naphthenates may also form deposits that obstruct and/or damage equipment, or may influence the oil quality.

The ARN family of naphthenic acids can react with divalent cations in produced water during depressurisation and can result in precipitations of metal ARN naphthenates in separators, valves and pipelines. Calcium ions are usually the counter ion in the ARN naphthenates. The precipitation will result in operational upsets, and shut-downs may be needed to remove the precipitated Ca ARN naphthenates. Chemical inhibitors are often injected prior to topside pressure release to prevent precipitation of Ca ARN naphthenates. The inhibitors act by preventing contact between the tetraprotic ARN naphthenic acids in the oil and calcium ions from produced water. Typically, surfactants, amines, quaternary ammonium compounds, quaternary phosphonium compounds, mixtures thereof, linear compounds having at least two carboxylic acids or acrylic acid functional moieties, or other compounds forming ligands with divalent metal ions, are used as chemical inhibitors. The use of such inhibitors is disclosed in US 2009/0036329. Use of inhibitors may not be sufficient to counteract all formation of Ca ARN naphthenates, since the content of ARN naphthenic acids can vary from well to well, and the chemical inhibitors react stoichiometrically with the ARN naphthenic acids. Also, many of the chemical inhibitors are combined with demulsifiers and the effectiveness of the inhibitors varies dependent on oil type and potential interaction with other production chemicals.

The third type of naphthenates usually not addressed by chemical inhibitors, the oil soluble naphthenates, may form after depressurisation during oil production. The oil soluble naphthenates are usually present in the calcium form, but other oil soluble metal naphthenates may also be formed. Oil soluble calcium naphthenates may form, which, if not removed, can lead to fouling and catalytic deactivation in subsequent oil-refining processes, and may reduce coke and other product qualities of the final-use liquid hydrocarbons. An acid treatment is typically used to remove metal naphthenates. WO2016101998 describes a process for removing oil soluble metal naphthenate from crude hydrocarbon mixtures at an oilfield facility. The addition of acid may be required to remove oil soluble metal naphthenates during the separation process. High concentrations of acid/organic salts in the produced water may be the result when oil soluble metal naphthenates are removed late in the separation process. The high concentration of acid may also result in low produced water pH at the injection point which can influence plant integrity. Also, the result may be a high content of organic salts in the produced water which can be problematic for onshore waste water treatment plants due to the increased total organic carbon load.

SUMMARY

It is an object of the present invention to overcome or at least mitigate the problems identified above.

In accordance with a first aspect of the present invention there is provided a method for managing metal naphthenates in produced hydrocarbons. The method comprises injecting acid and/or sour gas into produced hydrocarbons in a production well, flowline or riser, to thereby control the pH of fluids contained in the produced hydrocarbons and thereby manage metal naphthenates in the produced hydrocarbons.

The pH may be controlled to prevent an increase in the pH above a threshold pH value, to thereby prevent or mitigate the formation of metal naphthenates. The produced hydrocarbons may undergo a reduction in pressure during a processing stage that is performed after the acid and/or sour gas is injected, and the pH may be controlled to prevent an increase in the pH above the threshold value during the reduction in pressure. The pH may be controlled to lower the pH of the fluids contained in the produced hydrocarbons, to thereby remove metal naphthenates formed in a reservoir from which the produced hydrocarbons are produced.

The metal naphthenates may be oil-soluble metal naphthenates.

The metal naphthenates may be precipitated metal naphthenates.

The metal naphthenates may be calcium naphthenates.

The fluids contained in the produced hydrocarbons may be, or comprise, produced water.

The threshold pH value may be between 7.5 and 3, preferably between 7 and 4.0, and still more preferably between 6.2 and 4.5.

The acid and/or sour gas may be injected into the produced hydrocarbons through one or more openings in production tubing located in the production well, or one or more openings in the flowline or riser. The one or more openings in the production tubing, production flowline or production riser may be provided with valves to control the inflow of acid and/or sour gas.

The produced hydrocarbons may be contained in production tubing located in the production well, wherein the acid and/or sour gas is injected deep in the production well such that injection takes place close to a lower completion section.

Where acid is injected, the acid may be injected in an amount sufficient to create an oil-in-water emulsion in which the produced hydrocarbons are suspended as a dispersed phase within a continuous phase provided by the acid.

Where acid is injected, the acid may be injected in an amount sufficient to create a water-in-oil emulsion in which the acid is suspended as a dispersed phase within a continuous phase provided by the produced hydrocarbons.

The acid may comprise an inorganic acid.

The acid may comprise, or consist of, a carboxylic acid. The carboxylic acid may have an alkane chain comprising fewer than five, preferably fewer than four, carbons. The carboxylic acid may have a molecular weight of less than 400 g/mol, preferably less than 250 g/mol.

The acid may not form ligands or precipitate in the presence of divalent metal ions.

The acid and/or sour gas may have a higher temperature than fluids in a reservoir from which the produced hydrocarbons are produced.

The acid may be injected into the produced hydrocarbons in combination with gas.

Where the gas is sour gas, the acid and the sour gas may be injected simultaneously into the produced hydrocarbons in the production well.

The method may further comprise, before injecting the acid and/or sour gas: simulating, using a computing device, pH conditions in a production train through which the produced hydrocarbons are conveyed; and calculating, based on the results of the simulation, the concentration and amount of acid and/or sour gas to be injected.

Embodiments of the invention will now be described by way of example only and with reference to the accompanying drawings, in which:

DETAILED DESCRIPTION

Figure 1:
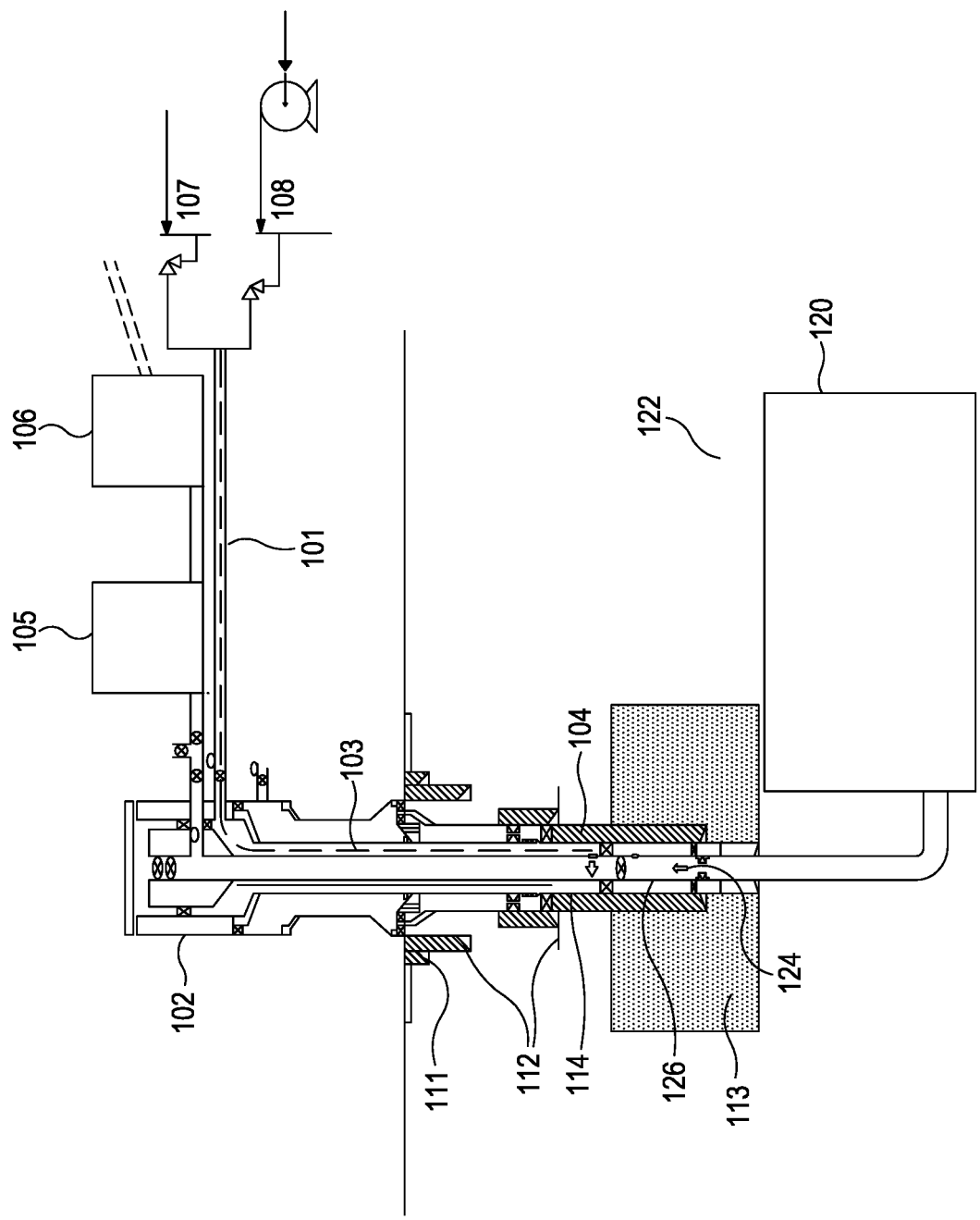
FIG. 1 shows a system for injecting a treatment fluid into a production well.

The invention is beneficial in that a conduit, e.g. a well, production riser, production tubing, or production flowline, that conveys produced liquid hydrocarbons at least part of the way between a reservoir and a processing facility is used as a 'reactor', i.e. a processing container, to perform processing steps that may otherwise need to be performed at the processing facility. The processing facility may be, for example, an oilfield facility located between a production well and a storage tank, a topsides processing facility located e.g. on a floating platform or skip, or a processing facility located on the seabed at a riser base between a flowline and a riser. The processing steps performed in the conduit may completely replace, or render obsolete, processing steps that would otherwise be performed at the processing facility, or processing steps may be performed partially in the conduit and partially at the processing facility. The substance(s) required for the processing steps, which may be a treatment fluid such as acid for the prevention of naphthenate formation, are injected into the produced liquid hydrocarbons while the hydrocarbons are located in the conduit. This means that the time taken for the produced liquid hydrocarbons to traverse the conduit, and to traverse any subsequent part of the production structure before the processing facility, is usefully exploited to increase the temperature, contact time and/or the potential for mixing between the treatment fluid(s) and the liquid hydrocarbons, thereby increasing the efficacy of the processing. The temperature of the conduit can be increased using heated liquids from the processing facility, resulting in more efficient processing. One or more processing stages may be performed before the treatment fluid is injected into the produced hydrocarbons. For example, a desalting stage may be performed at a subsea facility before the produced hydrocarbons enter a flowline, where the treatment fluid is injected into the produced hydrocarbons. In another possible embodiment, oil/water separation may be performed on produced hydrocarbons downhole, before the treatment fluid is injected into the produced hydrocarbons at a later stage in the production tubing in the well. The injection of the substance(s) into the liquid hydrocarbons while the liquid hydrocarbons remain under near-reservoir conditions, i.e. at desirable pressure (and, optionally, temperature), is an early intervention that may remove the need for processing steps that would otherwise be required at the processing facility. The amount of substance(s), or the concentration of substance(s), required in such an early intervention may be smaller than the amount that would otherwise be required in a processing step performed at the processing facility. For example, injecting a smaller amount of acid per unit volume of water into the produced liquid hydrocarbons in the conduit to lower the pH of the liquid hydrocarbons may prevent the formation of metal naphthenates, thereby potentially removing the need for a processing step or operations at the processing facility to remove metal naphthenates.

Hydrocarbons in a reservoir may contain naphthenic acids, and the acid content is typically quantified using the total acid number (TAN). Naphthenic acids are carboxylic acids whose affinity for the oil or water phase varies depending on chemical structure and pH of the water phase, where the water phase is typically water contained in the hydrocarbons. At low pH values the naphthenic acids are protonated and oil-soluble, whereas at higher pH values the naphthenic acids dissociate and are drawn to the oil-water phase boundary. Naphthenic acids contribute to the TAN of the oil, and the TAN is relevant to oil quality and refinery processing. Whilst naphthenic acids per se may affect oil quality and refinery processing (via influence over the TAN), they typically do not influence offshore processing. However, at increasing pH values dissociated naphthenic acids at the oil-water phase boundary may react with metal ions in the water phase to form different types of metal naphthenates. Monovalent metal naphthenates can stabilise emulsions, while divalent metal naphthenates, such as calcium naphthenates, can results in other types of challenges. Calcium naphthenates may be oil-soluble or precipitated. The precipitated Ca naphthenates are formed from the ARN family of naphthenic acids and the deposits can block pipelines and valves, and fill separators. Chemical inhibitors may partly prevent the formation of deposited naphthenates but are usually not 100% effective. The deposits are difficult to remove and shut-downs are often needed to remove the large amounts of deposits. Topside process equipment must often also be washed regularly with acidic water at low pH to remove small amounts of deposited Ca ARN naphthenates to avoid accumulation.

Oil-soluble calcium naphthenates (sCaN) do not precipitate, and may be at least partially removed in an acid treatment process at an oilfield facility, as described in WO2016101998. However, such treatments may result in low pH values (pH<3 topside) that can challenge process integrity, and market-acceptable sCaN levels may not be achieved. Removing sCaN or non-oil-soluble metal naphthenates at a processing facility are intensive operations that necessitate frequent maintenance of equipment and human oversight. If sCaNs are retained in the oil transported to a refinery, the sCaNs may cause fouling and catalytic deactivation in refinery processes, and may affect the coke quality, increasing costs for suppliers (i.e. refiners and/or customers of the crude oil) and reducing the price the suppliers can ask for their products.

In the reservoir and in production tubing the pH of hydrocarbons typically remains low, so the naphthenic acids remain in the oil phase. The higher-pH conditions that result in the formation of metal naphthenates typically occur as a result of depressurisation during processing at a processing facility, or from tie-in of new fields with a higher produced water pH. An increase in pH of 0.1 to 0.5 units may be sufficient to trigger the formation of metal naphthenates. Typical pH at a reservoir and an inlet separator are pH 5.75 and pH 6.4, respectively, where the increase in pH is due mainly to decreasing pressure. Typical values at the intermediate locations of a well head, a riser base and a riser top are pH 5.9, pH 6.08 and pH 6.21, respectively. The pH may rise even further from the inlet separator to a second stage separator, and more naphthenates can be formed on the way to the second stage separator. After second stage separator, the water content in the oil is typically sufficiently low to avoid further increases in the naphthenate content in the oil, even if the pH continues to increase. During pressure release e.g. at a production manifold, CO2 in the aqueous phase (i.e. in the produced water contained in the produced hydrocarbons) flashes and comes out of solution. The CO2 is therefore lost from the aqueous phase and the result is an increase in pH of the aqueous phase. CO2 in water lowers pH by forming carbonic acid (H2CO3), but when pressure is decreased and temperature increased the solubility of CO2 in water is reduced and CO2 is lost to the gas phase. Produced water also contains the base form of carbonic acid, bicarbonate ($HCO_3^-$), and this creates a buffer system in the aqueous phase with optimal pH in the range of 5.8 to 6.8 (pKa 6.3). As with any buffer system, the pH is balanced by the presence of both a weak acid (here, $H_2CO_3$) and its conjugate base (here, $HCO^-_3$), so that any excess acid or base introduced to the system is neutralised. During loss of CO2, the carbonic acid-bicarbonate buffer system will not be able to keep pH low during topside processing. It is also possible that some sCaN may be formed in the reservoir at some fields, dependent on pH in the reservoir, which is in turn dependent on alkalinity of water and pressure in the reservoir. In these cases pH in the reservoir can be 6.4 versus 5.9 in other reservoirs. This 0.5-unit increase in pH in the reservoir can be the difference between an oil containing 0 versus 500 ppm wt (mg/kg) Ca as sCaN. For the cases with higher reservoir pH and presence of high contents of sCaN, it is important to control and reduce pH to also reduce the content of pre-formed sCaNs. It is noted that the range of pH values that are most likely to result in the formation of sCaN lies within the range of pH values that can be expected during oil production. The likelihood of formation of sCaN becomes much lower for pH values lower than 6.5. Hence, by keeping the pH in the produced water lower than 6.5 from reservoir to export, we can hinder formation of sCaN. It is therefore desirable to control pH in produced water from the reservoir and through the topside process train by injecting acid into a riser, flowline or well to avoid an increase in pH during topside processing. Controlling pH in the aqueous phase (to avoid higher pH values during processing or any other event that would result in an increase in pH) can hinder formation of Ca-ARN-naphthenates (which result in precipitated Ca naphthenates) and sCaN (which may have a detrimental influence on oil quality).

A method for managing metal naphthenates in accordance with the present invention is directed to removing, or mitigating, the need for processing stage(s) at a processing facility to remove metal naphthenates. In this context, managing metal naphthenates includes preventing or mitigating the formation of metal naphthenates, and/or removing metal naphthenates. The metal naphthenates may be oil-soluble metal naphthenates, e.g. oil-soluble calcium naphthenates, and/or precipitated metal naphthenates, e.g. precipitated calcium ARN naphthenates. Acid and/or sour gas is injected into produced hydrocarbons contained in a conduit for conveying the produced hydrocarbons, to thereby control the pH of fluids contained in the produced hydrocarbons. A sour gas is a gas that is acidic either alone or when associated with water. The acid and sour gas may be injected together, separately, or alone. The acid and/or sour gas may be injected in combination with water, e.g. produced water that has been separated from produced fluids. When injected alone, the sour gas is a gas that lowers the pH of the fluids contained in the produced hydrocarbons, or changes the buffering capacity of the fluids contained in the produced hydrocarbons such that the pH will not increase beyond a certain value. The sour gas is, for example, a gas comprising at least one of carbon dioxide (CO2) and hydrogen sulphide (H2S). The sour gas may be gas that is stripped from oil later in the process (e.g. in a gas separation process) and contains CO2. The conduit conveying the produced hydrocarbons is e.g. a production well, production tubing contained in the production well, a flowline, a production flowline, a riser, or a production riser. In one embodiment the acid and/or sour gas is injected into the produced hydrocarbons before the produced hydrocarbons reach a processing facility, and before any processing stages are performed on the produced hydrocarbons at a processing facility. Alternatively, one or more processing stages—for example, separation in the well, subsea separation or separation at a wellhead platform—may be performed on the produced hydrocarbons before the acid and/or sour gas is injected into the produced hydrocarbons. As set out above, the method of managing metal naphthenates exploits the time that the produced hydrocarbons spend in the conduit to perform processing operations, in this case an acid treatment, that may otherwise need to be performed at a processing facility. The increased treatment time increases the likelihood that the acid will contact produced water contained in the produced hydrocarbons, and keep the pH of the produced water low. Keeping the pH below a threshold value throughout the production train, and in particular during depressurisation or after tie-in of a higher-pH produced water source, means that processing stages using potentially large amounts of low-pH acids may not be required at a processing facility. In one embodiment the threshold value is the pH at which metal naphthenates form. Alternatively, the threshold value is a pH value at which the amount of metal naphthenates formed, and/or the probability of formation of metal naphthenates, is deemed to be sufficiently low. The threshold value may vary from field to field and from well to well depending on conditions such as reservoir pressure, temperature and concentration and type of naphthenic acids. As set out above, the formation of sCaN and/or precipitated ARN naphthenates is prevented during production, avoiding the need for injection of chemical naphthenate inhibitors or an extra stage in the separation train to remove sCaN and/or metal ARN naphthenate deposits. The potential upsets and other problems associated with sCaN and metal ARN naphthenate deposits are also avoided, reducing the maintenance required at the processing facility and potentially enabling unmanned processing operations.

Produced waters contain naturally occurring acids, which may be organic acids, but usually at concentrations too low to influence pH, or to influence the buffer system created by bicarbonates. Addition of more acids, e.g. organic acids and in particular carboxylic acids, can result in formation of new buffer systems where the pH can be stabilised at lower pH values (5.0-6.5) during topside processing after loss of $CO_2$ during depressurisation. The optimal buffer pH range is typically pKa±1 meaning that e.g. acetic acid with a pKa value of 4.76 can create buffer systems up to pH 5.76. Examples of suitable acids for use in the method of the invention are formic acid (pKa 3.76), propionic acid (pKa 4.86), 3-hydroxypropanoic acid (pKa 4.51), malonic acid (pKa2 5.69), maleic acid (pKa2 6.07), malic acid (pKa2 5.2). In addition, combinations of one or more inorganic acids (e.g. HCl) and one or more organic acids, where the organic acids are e.g. carboxylic acids, or combinations of different organic acids (e.g. carboxylic acids), can be used to tailor buffer systems. In an alternative embodiment the acid to be injected is an inorganic acid, e.g. HCl. The acids chosen for pH adjustments should have a low molecular weight and be mostly water soluble at the threshold pH, to avoid partitioning of acids to the oil phase. Such partitioning of acids to the oil phase may be detrimental, because additional acid content in the oil may increase the TAN number of the oil and hence have a negative impact for the oil quality. Carboxylic acids having an alkane chain with fewer than five carbons in the alkane chain are preferred. Carboxylic acids having an alkane chain with fewer than four carbons in the alkane chain are more preferred. It is also possible to use carboxylic acids having an alkane chain with fewer than three carbons in the alkane chain. The carboxylic acids should preferably have a molecular weight lower than 400 g/mol, more preferably lower than 250 g/mol. In addition, the acids desirable for the invention are acids which do not form ligands or precipitate in the presence of divalent metal ions such as calcium.

FIG. 1 shows a well 114, in particular a production well, extending through a formation 122, and through a cap rock 113. The well has a conductor 111 and casings 112. Produced hydrocarbons 124 are conveyed in production tubing 126 from a reservoir 120. The production tubing 126 is located within the well 114. The produced hydrocarbons 124 typically contain liquid hydrocarbons, and impurities such as water, salts (which may be contained in the water), gases, organometallic compounds and organic acids, and solids. The liquid hydrocarbons are referred to here as oil. In this embodiment the formation 122 is a subsea formation and a Christmas tree (xmas tree) 102 is located on the seafloor above the well 114. The produced hydrocarbons 124 are routed through the xmas tree 102 to a processing facility 105, which is located between the xmas tree 102 and a storage tank 106. The produced hydrocarbons are subjected to processing stages such as gas/liquid separation and oil/water separation at the processing facility 105. Following processing, oil may be stored in storage tank 106, and/or transported away via pipeline or flowline. Treatment fluid 108 is injected into the produced hydrocarbons 124 before the produced hydrocarbons reach the processing facility 105. In particular, the treatment fluid 108 is injected into the produced hydrocarbons while the produced hydrocarbons are in the production tubing 126 located in the well 114. The treatment fluid is conveyed by a tube 101 towards the xmas tree 102, and is conveyed through the xmas tree to an annulus 103 between the production tubing 126 and a tubular outside the production tubing, e.g a casing. The treatment fluid 108 is injected into the produced hydrocarbons in the production tubing via an opening in the production tubing. In an embodiment the opening contains a valve 104 to control the inflow of treatment fluids into the production tubing. In an embodiment the tube extends through the xmas tree and the annulus and terminates at the opening in the production tubing. In an embodiment the opening is located below the water, below the seafloor and below the cap rock, close to a lower completion section.

In an embodiment the treatment fluid 108 is water or an aqueous solution, and gas 107 as well as treatment fluid 108 is injected into the production tubing, in line with the simultaneous water and gas lift (SWAGL) technique described in WO2017158049, the entire contents of which is incorporated herein by reference. The gas 107 may be combined with the treatment fluid 108 in the tube 101 before entering the well, or may be injected using separate tubing and a separate opening in the production tubing. The injection of both water and gas simultaneously reduces pressure losses both due to friction and gravity. The gas 107 may be sour gas. Without adding further pressure, the well pressure itself may be sufficient to transport the production fluids to the surface in combination with the reduction of pressure losses after injection of water and gas.

The treatment fluid may be heated before injection, and injected at a temperature higher than fluids in the reservoir from which the produced hydrocarbons are produced. Injecting heated treatment fluids will increase the temperature of the conduit, and increase the temperature of the produced hydrocarbons in the conduit. This will decrease the viscosity of the liquid hydrocarbons, increasing the mixing efficiency and facilitating transport of the produced hydrocarbons through the conduit.

In an embodiment the treatment fluid is, or comprises, acid and/or sour gas. The treatment fluid comprising acid and/or sour gas is injected into the produced hydrocarbons for the management of metal naphthenates, which are sCaN and/or non-oil-soluble, i.e. precipitated, metal naphthenates. The acid and/or sour gas is injected to lower the pH to remove metal naphthenates (in particular, sCaN) formed in a reservoir from which the hydrocarbons are produced, and/or to maintain the pH of the fluids contained in the produced hydrocarbons below the threshold pH value during processing, in particular during depressurisation, and/or following tie-in of a source of higher-pH produced water. The threshold pH value is between 7.5 and 3, preferably between 7 and 4.0, and still more preferably between 6.2 and 4.5. The treatment fluid may contain other chemicals such as naphthenate inhibitors. The acid is any acid suitable for preventing or mitigating the formation of metal naphthenates and/or removing metal naphthenates, in particular any acid with a pKa value in the range of 3.5 to 6.5. Using one or more of such acids, the pH can be stabilised at lower pH values, e.g. 5.0 to 6.5, during topside processing, or during any other event that would otherwise result in an increase in the pH above the threshold value. The optimal buffer pH range is typically pKa±1 meaning that e.g. acetic acid with a pKa value of 4.76 can create buffer systems up to pH 5.76.

Many different carboxylic acids can be used in the method. Examples of suitable acids are formic acid (pKa 3.76), propionic acid (pKa 4.86), 3-hydroksypropanoic acid (pKa 4.51), malonic acid (pKa2 5.69), maleic acid (pKa2 6.07), malic acid (pKa2 5.2), glyoxylic acid (pKa 3.5), carbonic acid (pKa 6.3), citric acid (pKa 4.76/6.39), glycolic acid (pKa 3.83), and acetic acid (pKa 4.76). In addition, combination of inorganic acids and carboxylic acids, and of different carboxylic acids can be used to tailor buffer systems. The acids chosen for pH adjustments should have a low molecular weight and be mostly water soluble at the threshold pH to avoid partitioning of acids to the oil phase as this may influence the TAN number of the oil and have negative impact for the oil quality. Carboxylic acids with an alkane chain shorter than five carbons in the alkane chain are preferred. Carboxylic acids with an alkane chain shorter than four carbons in the alkane chain are more preferred. Carboxylic acids with an alkane chain shorter than three carbons may be used. Other carboxylic acids should preferably have a molecular weight lower than 400 g/mol. In addition, the acids desirable for the invention are acids which do not form ligands or precipitate in the presence of divalent metal ions such as calcium. The sour gas is any sour gas suitable for preventing or mitigating the formation of metal naphthenates and/or removing metal naphthenates, for example $CO_2$ and/or $H_2S$. Any suitable acid and/or sour gas may be injected alone or in combination with one or more other suitable acids and/or sour gases. The acid may be injected in combination with water for desalting.

When acid is injected, the acid may be injected alone or in combination with water in an amount sufficient to create an oil-in-water emulsion in which the produced hydrocarbons are suspended as a dispersed phase within a continuous phase provided by the acid. Creating an oil-in-water emulsion in this way increases the likelihood that the acid will contact the fluids contained in the produced hydrocarbons, to thereby control the pH of the fluids, is increased. Alternatively, the acid may be injected in smaller amounts sufficient to create a water-in-oil emulsion wherein the acid is suspended as a dispersed phase within a continuous phase provided by the produced hydrocarbons. In water-continuous production in the well, it will be easier to mix the acid and the produced water.

The pH in the produced water can be simulated from the reservoir and throughout the separation train, using known software packages and a computer. The results of the simulation can then be used to calculate the concentration of acid and/or sour gas required to counteract the loss of $CO_2$ during depressurisation (or, in other words, to replace the carbonic acid with another acid) and to avoid an increase in pH during processing of the oil, and/or the concentration of acid required to lower the pH for the removal of pre-formed metal naphthenates.

Figure 2:
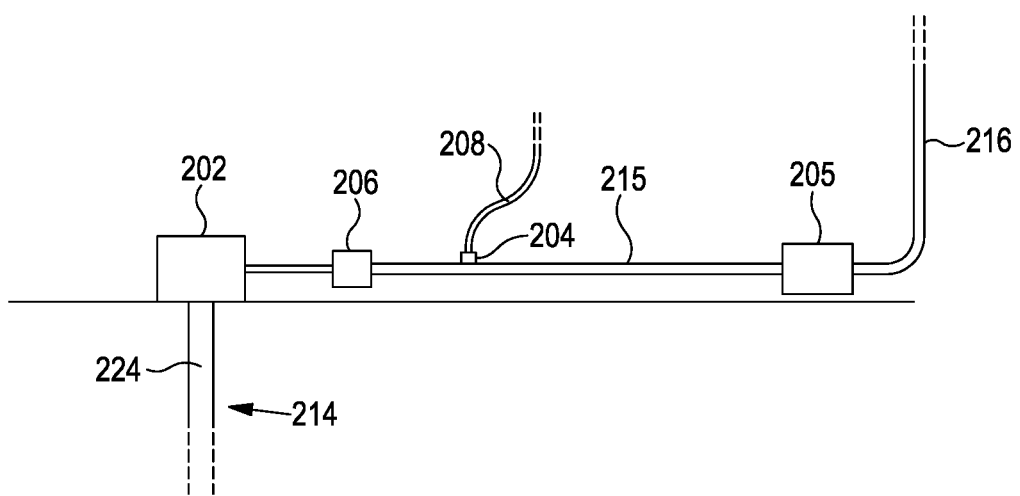
FIG. 2 shows a system for injecting a treatment fluid into a flowline.

FIG. 2 shows an embodiment which is functionally similar to the embodiment of FIG. 1, with the exception that the location of the processing facility and the location at which the treatment fluid is injected are different. Produced hydrocarbons 224 are conveyed from a reservoir via a production well 214 and through an xmas tree 202. The produced hydrocarbons 224 may be stored in storage tank 206 before being transported via production flowline 215 to a processing facility 205. In FIG. 2 the processing facility 205 is shown at or near the base of a riser 216. Alternatively, the processing facility 205 may output oil and/or other products of the processing to a further flowline or other conduit. Treatment fluid 208 is injected into the produced hydrocarbons while the produced hydrocarbons are located in the production flowline 215, and before the produced hydrocarbons reach the processing facility 205. The treatment fluid 208 is injected via an opening in the production flowline. The opening may contain a valve 204 to control the inflow of the treatment fluid.

Figure 3:
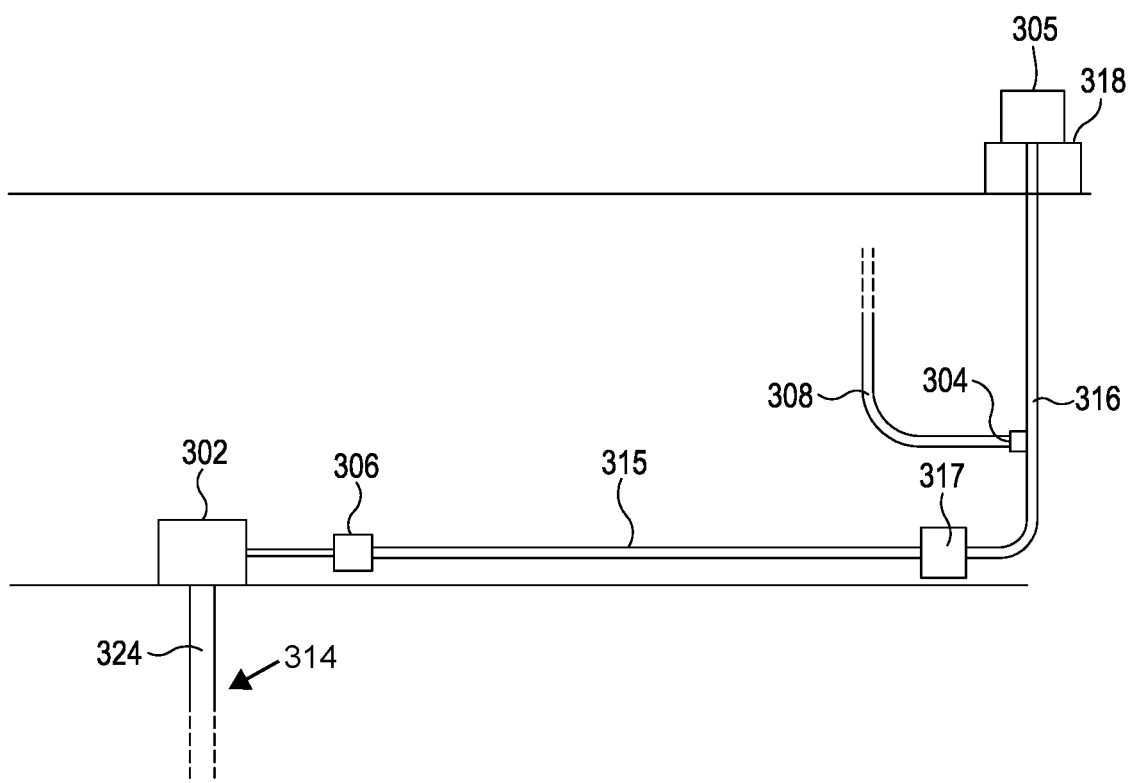
FIG. 3 shows a system for injecting a treatment fluid into a riser.

FIG. 3 shows an embodiment which is functionally similar to the embodiment of FIG. 1 and FIG. 2, with the exception that the location of the processing facility and the location at which the treatment fluid is injected are different. Produced hydrocarbons 324 are conveyed from a reservoir via a production well 314 and through an xmas tree 302. The produced hydrocarbons 324 may be stored in storage tank 306 before being transported via production flowline 315, riser base 317 and riser 316 to a topsides processing facility 305 located on a platform 318. The platform 318 may be, for example, a floating platform anchored to the seabed by cables, or a skip. Treatment fluid 308 is injected into the produced hydrocarbons while the produced hydrocarbons are located in the production riser 316, and before the produced hydrocarbons reach the processing facility 305. The treatment fluid 308 is injected via an opening in the production flowline. The opening may contain a valve 304 to control the inflow of the treatment fluid.

Figure 4:
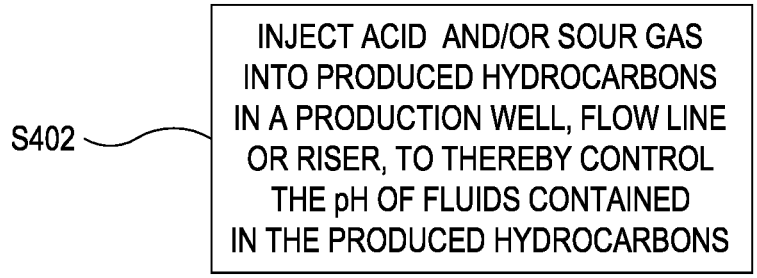
FIG. 4 shows a high-level flow diagram describing a method in accordance with the invention.

FIG. 4 shows a high-level flow diagram illustrating the method. In step S402, acid and/or sour gas is injected into produced hydrocarbons in a production well, flowline or riser, to thereby control the pH of fluids contained in the produced hydrocarbons.

Figure 5:
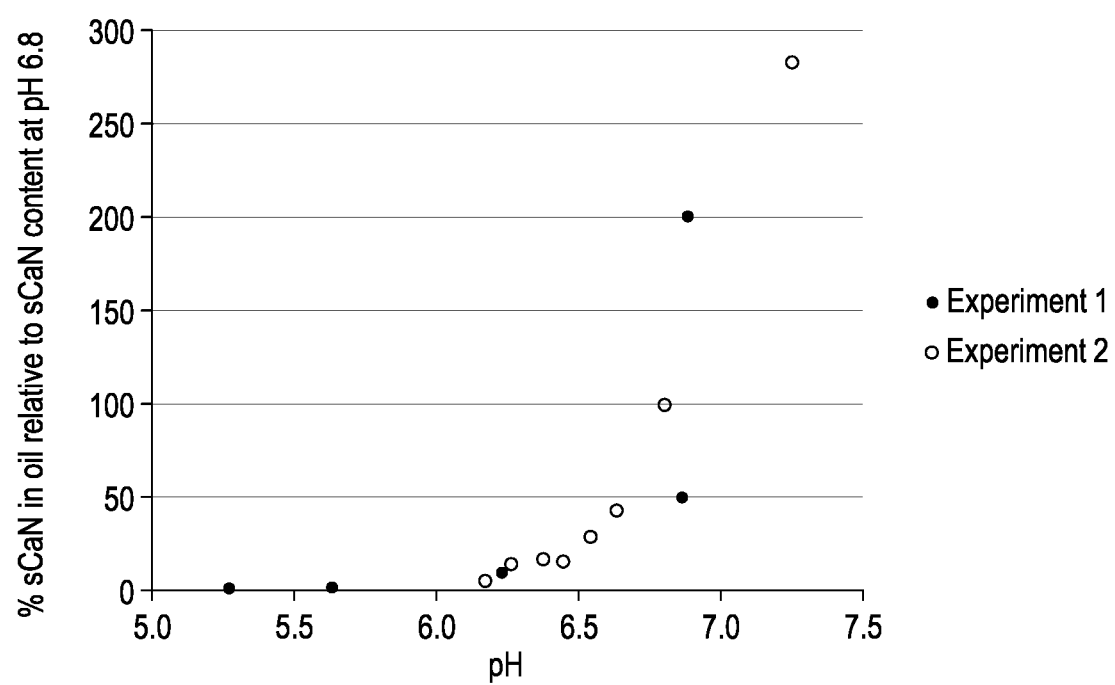
FIG. 5 shows a graph illustrating the build-up of sCaN when the pH is increased.

FIG. 5 shows a specific example of a graph illustrating the build-up of sCaN in one type of oil when the pH is increased. The graph plots the sCaN content against the pH of fluids in the example oil, where the sCaN content is normalised relative to the sCaN content at pH 6.8. The graph shows data from laboratory experiments in which an acid was injected into one specific oil-water system with a water cut of 50%.

For this specific oil-water system, if pH can be kept <6.25 it is possible to hinder formation of sCaN and significantly reduce the sCaN content in the oil phase. The threshold pH may vary from oil to oil.

Features of the embodiments described above may be combined as required.

It will be appreciated by the person of skill in the art that various modifications may be made to the above described embodiments without departing from the scope of the present invention.

The invention claimed is:

1. A method for preventing or mitigating the formation of, and/or removing, metal naphthenates in produced hydrocarbons during an artificial lift procedure, the method comprising:
   injecting acid and sour gas simultaneously into produced hydrocarbons in a production well to facilitate lift of the produced hydrocarbons and to control the pH of fluids contained in the produced hydrocarbons to prevent an increase in the pH above a threshold pH value,
   to thereby, as a result of said preventing an increase in the pH above the threshold pH value, prevent or mitigate the formation of, and/or remove, metal naphthenates in the produced hydrocarbons,
   wherein the threshold pH value is the pH value at which metal naphthenates would otherwise form.

2. The method of claim 1, wherein the produced hydrocarbons undergo a reduction in pressure during a processing stage that is performed after the acid and sour gas is injected, and the pH is controlled to prevent an increase in the pH above the threshold value during the reduction in pressure.

3. The method of claim 1, wherein the pH is controlled to lower the pH of the fluids contained in the produced hydrocarbons, to thereby remove metal naphthenates formed in a reservoir from which the produced hydrocarbons are produced.

4. The method of claim 1, wherein the metal naphthenates are oil-soluble metal naphthenates, precipitated metal naphthenates, and/or calcium naphthenates.

5. The method of claim 1, wherein the fluids contained in the produced hydrocarbons are, or comprise, produced water.

6. The method of claim 1, wherein the threshold pH value is between 7.5 and 3.

7. The method of claim 1, wherein the acid and sour gas is injected into the produced hydrocarbons through one or more openings in production tubing located in the production well.

8. The method of claim 7, wherein the one or more openings in the production tubing are provided with valves to control the inflow of acid and sour gas.

9. The method of claim 1, wherein the produced hydrocarbons are contained in production tubing located in the production well, wherein the acid and sour gas is injected deep in the production well such that injection takes place close to a lower completion section.

10. The method of claim 1, wherein the acid comprises an inorganic acid.

11. The method of claim 1, wherein the acid comprises, or consists of, a carboxylic acid.

12. The method of claim 11, wherein the carboxylic acid has an alkane chain comprising fewer than five carbons.

13. The method of claim 11, wherein the carboxylic acid has a molecular weight of less than 400 g/mol.

14. The method of claim 1, where the acid does not form ligands or precipitate in the presence of divalent metal ions.

15. The method of claim 1, wherein the acid and sour gas has a higher temperature than fluids in a reservoir from which the produced hydrocarbons are produced.

16. The method of claim 1, further comprising, before injecting the acid and sour gas:
simulating, using a computing device, pH conditions in a production train through which the produced hydrocarbons are conveyed; and
calculating, based on the results of the simulation, the concentration and amount of acid and sour gas to be injected.

* * * * *